No. 681,086. Patented Aug. 20, 1901.
J. V. WASHBURNE.
FASTENER FOR GLOVES, &c.
(Application filed Aug. 1, 1900.)

(No Model.)

WITNESSES
INVENTOR
James V. Washburne
PER
L. W. Serrell & Son
ATTYS

UNITED STATES PATENT OFFICE.

JAMES V. WASHBURNE, OF WATERBURY, CONNECTICUT, ASSIGNOR TO THE CONSOLIDATED FASTENER COMPANY, OF PORTLAND, MAINE.

FASTENER FOR GLOVES, &c.

SPECIFICATION forming part of Letters Patent No. 681,086, dated August 20, 1901.

Application filed August 1, 1900. Serial No. 25,502. (No model.)

*To all whom it may concern:*

Be it known that I, JAMES V. WASHBURNE, a citizen of the United States, residing at Waterbury, in the county of New Haven and State of Connecticut, have invented an Improvement in Fasteners for Gloves, Garments, &c., of which the following is a specification.

My invention relates to snap-fasteners for wearing-apparel generally, including gloves and garments, said snap-fasteners employing two connectible portions, the one a stud member and the other a socket member.

In carrying out my invention and for either the stud or socket member I employ an attaching part and an inner part, and the flexible material intervenes and extends beyond these parts, and the free edge of the attaching part is turned inwardly over the flexible material and base of the inner part.

My present invention relates particularly to special forms in the stud and socket members, the object sought with the stud member being to minimize or do away with metal in the part that comes against the flesh and to raise the intervening flexible material, so that, if possible, only flexible material will bear against the flesh, and in the socket member the inner part is made of convex form, with the edge of the open center inwardly turned or formed as a semicircular rib, which strengthens and stiffens the said part and at the same time produces a smooth and not abrupt surface to allow the passage of the spring-arms of the skeleton stud, and in connection with the skeleton spring-stud I may employ a flanged conoidal dome to support the same and prevent accidental crushing.

Figure 2:
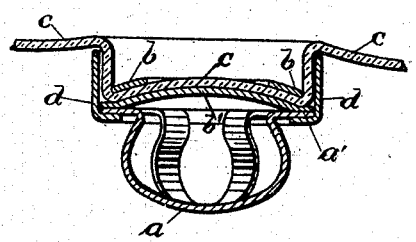
Figure 1:
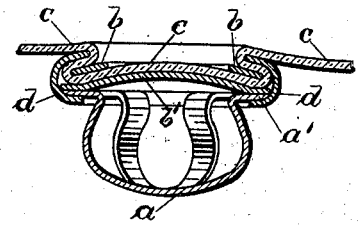
Figure 4:
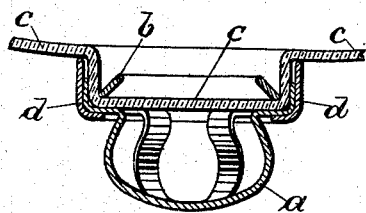
Figure 3:
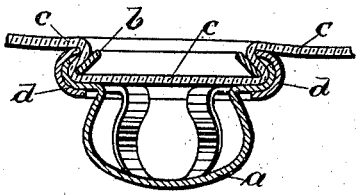
Figure 5:
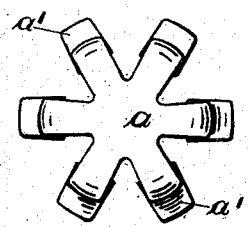
Figure 6:
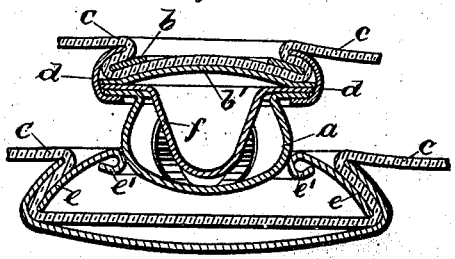

In the drawings, Figure 1 is a vertical section of the parts comprising the stud member as connected together. Fig. 2 is a cross-section of the same parts previous to being connected. Figs. 3 and 4 are cross-sections of connected and disconnected parts of stud members of modified form. Fig. 5 is a plan of the skeleton spring-stud of radiating arms, and Fig. 6 is a cross-section of the stud member and socket member in the act of snapping the parts together.

$a$ represents the skeleton spring-stud of radiating arms from a common center, stamped out of sheet metal and cupped up to shape. The free ends of these arms are bent over into approximately the same plane, and the extreme ends of said arms may be again bent upwardly at right angles to the other parts.

$b$ represents the centrally-arranged support in the form of a flattened or flaring ring, which in either case provides for the surface of the flexible material $c$ within being exposed. The attaching part $d$ is made with side portions and a receiving angle, and the free edge is turned inwardly over the centrally-arranged support and the flexible material to connect the parts in both the stud and socket members. This attaching part $d$ is preferably provided in the stud member with an open center, and in the socket member the center may be open or closed at pleasure. In Figs. 1 and 2 the free ends $a'$ of the arms of the spring-stud are bent over into the same plane and the said dome-shaped spring-stud is passed through the open center of the attaching part, so that the ends of the arms lie against the inner surface of the attaching part and in the receiving angle, and, as shown in Figs. 1 and 2, I prefer to employ a convex foundation-disk $b'$, received in the attaching part above the spring-stud, with the periphery of the said disk lying upon the ends of the said radiating arms in the receiving angle of the attaching part, and the centrally-arranged support $b$ is brought down into the attaching part, with the fabric intervening in the position shown in Fig. 2, and the free edge of the attaching part is thereafter to be turned over, with the flexible material upon the centrally-arranged support or flattened ring $b$, into the form shown in Fig. 1 in connecting the parts of the stud member.

It will be noticed that with these parts so connected very little of the metal of the central support $b$ is shown, the flexible material being elevated in the open center of the said support by the foundation-disk $b'$, so that to all intents and purposes the surface of the stud member that comes next the flesh will only present the flexible material to bear upon the flesh.

In the modified form of stud member shown in Figs. 3 and 4 the extreme ends of the arms of the spring-stud are bent upwardly. The dome-shaped part of said spring-stud passes through the open center of the attaching part, the same as in Figs. 1 and 2, and into the receiving-angle. The flaring ring forming the centrally-arranged support is received with the intervening flexible material down into the attaching part, with the free edge of the attaching part turned inwardly with the flexible material over and upon the surface of the said central ring and at the same time turning over the points or extreme ends of the radiating arms, causing them also to clench beneath the edge of the attaching part.

The inner part $e$ of the socket member is of convex form, with the edge of the open center inwardly turned to form a substantially semicircular rib $e'$. This rib greatly stiffens the inner part of the socket member and presents a smooth surface of appreciable area against which the radiating arms of the skeleton spring-stud member bear as the two parts are snapped together.

I may prefer, as shown in Fig. 6, to employ a flanged conoidal dome within the stud member, the object of which is to prevent the accidental crushing in of the stud member to such an extent that the spring function of the radiating arms will be destroyed, the flange of this conoidal dome $f$ coming within the attaching part between the free ends of the said radiating arms and the periphery or edge of the convex foundation-disk $b'$, so that the same is held rigidly in place, and while the introduction of this conoidal dome necessarily increases the size of the attaching part and the projection thereof from the surface of the flexible material the same will probably not be such a source of objection as to prevent the use thereof, although I do not limit myself to using this dome.

I claim as my invention—

1. In a stud-and-socket fastening device for wearing-apparel, the combination with the flexible material, of a skeleton spring-stud with arms radiating from a common center cupped up to shape with the free ends of the said arms in the same plane, an attaching part with side portions, a receiving-angle and an open center with the skeleton spring-stud received within the open center, a convex foundation-disk received within the attaching part over the arms of the stud part and a centrally-arranged support in the form of a ring received down into the attaching part with the flexible material intervening and the free edge of the attaching part turned inwardly over the flexible material and the centrally-arranged support, substantially as set forth.

2. In a stud-and-socket fastening device for wearing-apparel, the combination with the flexible material, of an attaching part and spring-stud of radiating arms, a ring forming a centrally-arranged support within which the flexible material is visible, received with the flexible material into and the parts held by the overturned edge of the attaching part, and means for causing the flexible material within the ring to be raised to present a flexible-material surface on one side of the stud member, substantially as set forth.

3. In a stud-and-socket fastening device for wearing-apparel, the combination with the flexible material, of an attaching part and spring-stud of radiating arms, a ring forming a centrally-arranged support within which the flexible material is visible, received with the flexible material into and the parts held by the overturned edge of the attaching part, an inner foundation-disk for causing the flexible material within the ring to be raised to present a flexible-material surface on one side of the stud member, substantially as set forth.

4. In a stud-and-socket fastening device for wearing-apparel, the combination with the flexible material, of a skeleton spring-stud with arms radiating from a common center cupped up to shape, an attaching part with side portions a receiving-angle and an open center, with the skeleton spring-stud received within the open center, and a centrally-arranged support in the form of a ring received down into the attaching part with the flexible material intervening and the free edge of the attaching part turned inwardly over the flexible material and the centrally-arranged support, substantially as set forth.

Signed by me this 12th day of July, 1900.

JAMES V. WASHBURNE.

Witnesses:
GEO. T. PINCKNEY,
BERTHA M. ALLEN.